United States Patent
Song et al.

(10) Patent No.: US 9,354,305 B2
(45) Date of Patent: May 31, 2016

(54) METHOD FOR PRODUCING AT LEAST INFORMATION FOR TRACK FUSION AND ASSOCIATION FOR RADAR TARGET TRACKING, AND STORAGE MEDIUM THEREOF

(71) Applicant: AGENCY FOR DEFENSE DEVELOPMENT, Daejeon (KR)

(72) Inventors: Taeklyul Song, Seoul (KR); Jeonhee Yoo, Seoul (KR); Seungjin Park, Seoul (KR); Hyoekjin Choi, Seongnam-si (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 238 days.

(21) Appl. No.: 14/083,593

(22) Filed: Nov. 19, 2013

(65) Prior Publication Data

US 2014/0139367 A1 May 22, 2014

(30) Foreign Application Priority Data

Nov. 22, 2012 (KR) .......................... 10-2012-0132768

(51) Int. Cl.
*G01S 13/66* (2006.01)
*G01S 13/00* (2006.01)
(Continued)

(52) U.S. Cl.
CPC ............... *G01S 13/66* (2013.01); *G01S 13/003* (2013.01); *G01S 13/723* (2013.01); *G01S 13/878* (2013.01)

(58) Field of Classification Search
CPC ....... G01S 13/003; G01S 13/66; G01S 13/72; G01S 13/723; G01S 13/87; G01S 13/878; G01S 13/88; G01S 13/91; G01S 3/78; G01S 3/782; G01S 3/785; G01S 3/786; G01S 3/7864; G06K 9/62; G06K 9/6217; G06K 9/6232; G06K 9/6247
USPC .................... 342/59–61, 73–81, 175, 195, 29, 342/89–103, 52, 58; 382/100, 103
See application file for complete search history.

(56) References Cited

U.S. PATENT DOCUMENTS 5,294,930 A * 3/1994 Li .......................... G01S 13/003
342/58
5,798,942 A * 8/1998 Danchick .............. G01S 3/7864
342/94

(Continued)

OTHER PUBLICATIONS

W.Y. Choi et al., "A Survey on Track Fusion for Radar Target Tracking," The Korea Institute of Military Science and Technology, vol. 11, No. 1, pp. 85-92, Feb. 2008.

(Continued)

*Primary Examiner* — Bernarr Gregory
(74) *Attorney, Agent, or Firm* — LRK Patent Law Firm (57) ABSTRACT

A method for producing at least information for track association and fusion includes: collecting measurement values of targets for each sensing period; predicting state variables for the targets and error covariances for the state variables by using the collected measurement values and tracking the targets by using a reformed target tracking algorithm; transmitting track information including only data of the error covariance largest occupied among the error covariances to a fusion center; calculating similarity between the pre-stored fused track and the transmitted track information; sorting the track information by using the calculated similarity; and carrying out the track fusion based on the sorted track information.

7 Claims, 5 Drawing Sheets

(51) Int. Cl.
*G01S 13/72* (2006.01)
*G01S 13/87* (2006.01)

(56) References Cited

U.S. PATENT DOCUMENTS

| | | | | |
|---|---|---|---|---|
| 5,955,989 | A * | 9/1999 | Li | G01S 13/003 342/58 |
| 6,567,037 | B1 * | 5/2003 | Fung | G01S 13/91 342/29 |
| 7,574,057 | B1 * | 8/2009 | Yang | G06K 9/6247 382/103 |
| 7,719,461 | B1 * | 5/2010 | Mookerjee | G01S 13/87 342/59 |
| 8,052,054 | B1 * | 11/2011 | Mingrone | G01S 13/723 342/95 |

OTHER PUBLICATIONS

W.Y. Choi et al., "Performance Evaluation of Track-to-track Association and Fusion in Distributed Multiple Radar Tracking," The Korea Institute of Military Science and Technology, vol. 11, No. 6, pp. 38-46, Dec. 2008.

C.H. Kwon et al., "The Design and Implementation for Efficient C2A," The Korea Institute of Military Science and Technology, vol. 12, No. 6, pp. 733-738, Dec. 2009.

* cited by examiner

METHOD FOR PRODUCING AT LEAST INFORMATION FOR TRACK FUSION AND ASSOCIATION FOR RADAR TARGET TRACKING, AND STORAGE MEDIUM THEREOF

CROSS-REFERENCE TO RELATED APPLICATION

This application claims priority to Korean Patent Application No. 10-2012-0132768 filed on Nov. 22, 2012, which is incorporated herein by reference in its entirety.

BACKGROUND OF THE INVENTION

1. Field of the Invention

Exemplary embodiments of the present invention relate to a method for track fusion and association for radar target tracking, and particularly, to a method for producing at least information for track fusion and association for radar target tracking capable of associating and fusing tracks by using only a portion of information of an error covariance occupying a considerable amount of data under the environment in which traffic is limited.

Further, exemplary embodiments of the present invention relate to a storage medium storing a method for producing at least information for track fusion and association for radar target tracking capable of associating and fusing tracks by using only a portion of information of an error covariance occupying a considerable amount of data under the environment in which traffic is limited.

2. Description of Related Art

Generally, to carry out a method for track fusion and association, a state variable of tracks and all data of an error covariance need to be transmitted to a fusion center which carries out fusion.

In this case, however, since a data amount to be transmitted is large, the method for track fusion and association is not suitable to be used under the environment in which data traffic is limited.

Therefore, to solve the problem, a method for producing and transmitting at least information of an error covariance occupying the largest amount of data among the data used in the method for track fusion and association for radar target tracking requires an algorithm for showing estimation performance similar to the track association and fusion performance in accordance with the related art.

SUMMARY OF THE INVENTION

An embodiment of the present invention is directed to a method for producing at least information for track fusion and association for radar target tracking capable of associating and fusing tracks by using only some information on an error covariance occupying a considerable amount of data under the environment in which traffic is limited.

Another embodiment of the present invention is directed to a storage medium storing a method for producing at least information for track fusion and association for radar target tracking capable of associating and fusing tracks by using only some information of an error covariance occupying a considerable amount of data under the environment in which traffic is limited.

Another embodiment of the present invention is directed to a method for producing at least information for track fusion and association for radar target tracking capable of associating and fusing tracks by using only a portion of information of an error covariance occupying a considerable amount of data under the environment in which traffic is limited.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for producing at least information for track association and fusion includes: collecting measurement values of targets for each sensing period; predicting state variables for the targets and error covariances for the state variables by using the collected measurement values and tracking the targets by using a reformed target tracking algorithm; transmitting track information including only data of the error covariance largest occupied among the error covariances to a fusion center; calculating similarity between the pre-stored fused track and the transmitted track information; sorting the track information by using the calculated similarity; and carrying out the track fusion based on the sorted track information.

The target tracking algorithm may be a Kalman filter.

The data of the error covariance largest occupied among the error covariances may be produced by using a minimum information production scheme.

The state variable may be a three-dimensional position, a velocity, and an acceleration of the target.

The minimum information production scheme may produce, as a representative value, the largest values for each axis among variance values of the position, the velocity, and the acceleration.

Errors of the position, the velocity, and the acceleration may be similar at each axis.

A correlation between the state variable components may be disregarded.

In accordance with another embodiment of the present invention, a storage medium stores program instruction codes executing the method for producing at least information for track fusion and association described above.

DESCRIPTION OF SPECIFIC EMBODIMENTS

Hereinafter, a method for producing at least information for track fusion and association for radar target tracking in accordance with embodiments of the present invention will be described in detail with reference to the accompanying drawings.

Figure 1:
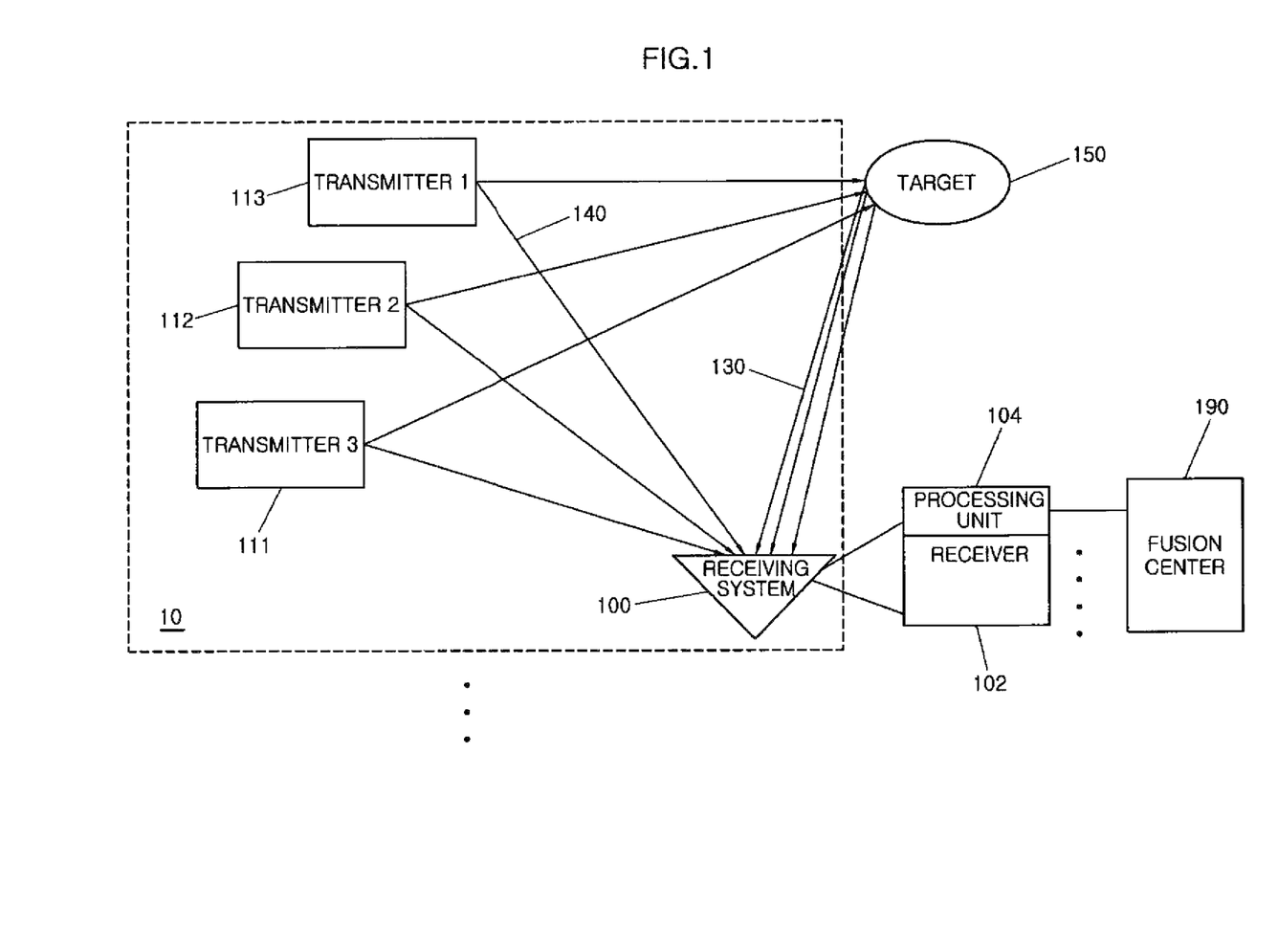
FIG. 1 is a network configuration diagram using a radar system detecting a target in accordance with an embodiment of the present invention.

FIG. 1 is a network configuration diagram using a radar system detecting, a target in accordance with an embodiment of the present invention. In particular, the network configuration diagram illustrated in FIG. 1 illustrates an adaptive radar system, but the embodiment of the present invention is not limited thereto and therefore various radar systems may be possible.

Referring to FIG. 1, a radar detection system 10 is configured to include a receiving system 100 for tracking at least one target 150 interested by using signals from a plurality of transmitters 110, 112, and 114.

The receiving system 100 represents a group of wide range multistatic target monitoring sensors. The receiving system 100 may use a continuous wave (CW), and the like.

The receiving system 100 may receive signals from the plurality of transmitters 110, 112, and 114. However, the transmitters 110, 112, and 114 may include any device, system, or unit for transmitting signals which are not controlled.

The transmitters 110, 112, and 114 may transmit transmitted signals. Some of the signals are reflected by at least one target 150 interested and are received by the receiving system 100.

For example, a reflected transmitting signal 130 may be reflected by the target 150 and may be received by the receiving system 100. Further, a transmitted signal 140 from the transmitter 114 may be directly received by the receiving system 100. The receiving system 100 compares the transmitted signal 140 with the reflected signal 130 so as to determine positional information on at least one target 150 interested.

The reflected signal 130 may be also known as a target path signal. The positional information may include any information associated with a position of the target 150, including a position, a velocity, and an acceleration from a determination of a time difference of arrival (TDOA), a frequency difference of arrival (FDOA), and an angle of arrival (AOA).

Further, the receiving system 100 includes a receiver 102, processing units 104, and the like.

Further, the transmitter 111 may be a transmitter array and the receiver 102 may be a receiver array. The transmitter 111 may include a plurality of elements, in which each element transmits independent signals.

Further, the receiver 102 may be a mobile receiver array which includes a plurality of elements, in which each element is arranged to receive scattered signals.

The processing unit 104 determines the position of the target 150 based on the received signal information and/or the transmitted signal information which is, generated by the receiver 102 and/or the transmitters 111, 112, and 113. Further, a state variable and an error covariance of a local track are calculated and a data amount of the error covariance occupying a considerable amount of data among the state variable and the error covariance of the calculated local track is minimized, which are then transmitted to a fusion center 190.

The fusion center 190 serves to carry out the track association by using some of data transmitted from the plurality of processing units 104 and carry out the track fusion.

For this purpose, the fusion center 190 includes a server (not illustrated) which implements an algorithm for carrying out track association and/or track fusion, a database (not illustrated), and the like. A configuration for carrying out the track association, the track fusion, and the like has been widely known, and therefore will be no more described to clearly understand the present invention.

In particular, the embodiment of the present invention is implemented by the algorithm for carrying out track association and fusion by using only some information of the error covariance occupying the considerable amount of data under the environment in which traffic is limited.

In other words, a method for producing at least information for track association and fusion in a system with a limited communication band width in accordance with an embodiment of the present invention may include minimizing and transmitting the data amount of error covariance occupying the considerable amount of data among the state variables and the error covariances for targets which are transmitted by each sensor so as to carry out the method for track association and fusion, carrying out the track association by using some of the transmitted data, and carrying out the track fusion.

The algorithm will be described in more detail with reference to FIGS. 2 to 4.

Figure 2:
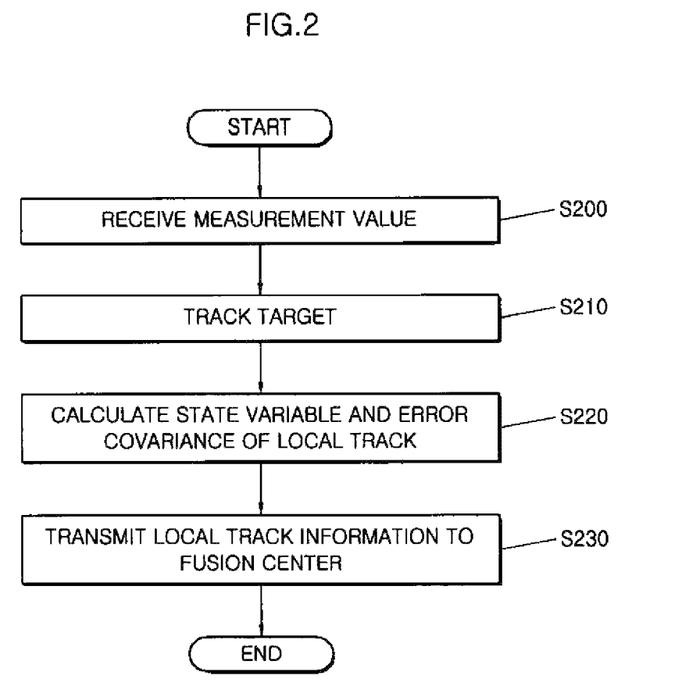
FIG. 2 is a flow chart illustrating a target tracking algorithm in a radar system for transmitting at least error covariance data in accordance with an embodiment of the present invention.

FIG. 2 is a flow chart illustrating a target tracking algorithm in a radar system for transmitting at least error covariance data in accordance with an embodiment of the present invention.

Referring to FIG. 2, the target tracking algorithm illustrated in FIG. 2 is an algorithm carried out by radar to first collect measurement values of targets for each sensing, period (S200).

The state variables for the targets 150 (FIG. 1) and the error covariances of the state variables are predicted by using the collected measurement values and the targets 150 are tracked by the reformed target tracking algorithm (S210 and S220). Herein, as the target tracking algorithm, a Kalman filter, and the like may be used.

As the track result, the local track information is generated and the generated local track information is transmitted to the fusion center 190 (FIG. 1) for carrying out track association and fusion (S230).

Further, when the local track information is transmitted from the receiving system 100 (FIG. 1) to the fusion center 190 (FIG. 1), all the data for track association and fusion are not transmitted, but only some data of the error covariance largest occupying the data amount are transmitted by using a minimum information production scheme.

Further, the track information includes the predicted and reformed state variable, the error covariance, and the like.

Further, when the state variable is assumed to be a three-dimensional position, a velocity, and an acceleration, the minimum information production scheme produces, as a representative value, the largest values for each axis among variance values of the position, the velocity, and the acceleration under the assumption that errors of the position, the velocity, and the acceleration may be similar at each axis and the assumption that a correlation between state variable components may be disregarded.

A state variable component X of the target 150 is represented by the following Equation.

$$X = [xyz\dot{x}\dot{y}\dot{z}\ddot{x}\ddot{y}\ddot{z}]^T \qquad \text{[Equation 1]}$$

In the above Equation 1, x,y,z represents positional components of each axis of the target, $\dot{x},\dot{y},\dot{z}$ represents a velocity component of the target, and $\ddot{x},\ddot{y},\ddot{z}$ represents an acceleration component of the target. T represents a transpose function.

Here, the state variable component X represents an assumed value.

Unlike this, the state variable component representing a real tracking result value of the target is represented by $\hat{X}$, in which reliability of the $\hat{X}$ represented by the error covariance depends on the following Equation 2.

$$P = E\left[(X - \hat{X})(X - \hat{X})^T\right] = \begin{bmatrix} \sigma_{xx}^2 & \sigma_{xy}^2 & \cdots & \sigma_{x\ddot{z}}^2 \\ \sigma_{yx}^2 & & & \vdots \\ \vdots & & \ddots & \vdots \\ \sigma_{\ddot{z}x}^2 & \cdots & & \sigma_{\ddot{z}\ddot{z}}^2 \end{bmatrix} \quad \text{[Equation 2]}$$

In the above Equation 2, E[ ] represents an average value and each error covariance $\sigma^2$ is represented by a total of 81 data. In other words, the state variable component X is 9 and therefore 9×9=81.

Only the maximum values for a positional component p, a velocity component v, and an acceleration component α which are selected depending on the above Equation 2 are represented by the following Equation 3.

$$\sigma_p^2 = \max(\sigma_{xx}^2, \sigma_{yy}^2, \sigma_{zz}^2)$$

$$\sigma_v^2 = \max(\sigma_{\dot{x}\dot{x}}^2, \sigma_{\dot{y}\dot{y}}^2, \sigma_{\dot{z}\dot{z}}^2)$$

$$\sigma_a^2 = \max(\sigma_{\ddot{x}\ddot{x}}^2, \sigma_{\ddot{y}\ddot{y}}^2, \sigma_{\ddot{z}\ddot{z}}^2) \quad \text{[Equation 3]}$$

The above Equation 3 which is represented by a new error covariance $P_{new}$ in accordance with the embodiment of the present invention is represented by the following Equation 4.

$$P_{new} = \begin{bmatrix} \sigma_p^2 I_{3\times 3} & 0_{3\times 3} & 0_{3\times 3} \\ 0_{3\times 3} & \sigma_v^2 I_{3\times 3} & 0_{3\times 3} \\ 0_{3\times 3} & 0_{3\times 3} & \sigma_a^2 I_{3\times 3} \end{bmatrix} \quad \text{[Equation 4]}$$

In the above Equation 4, $I_{3\times 3}$ represents a unit matrix and $0_{3\times 3}$ represents a value of "0".

In other words, only the maximum value is selected by taking only the diagonal direction in the matrix of the above Equation 2.

When the error covariance allows for a symmetric matrix, in the case in which data are transmitted based on the error covariance P which is the conventional method, the traffic becomes 45, but in the case in which data are transmitted based on the new error covariance $P_{new}$ in accordance with the embodiment of the present invention, the traffic becomes 3.

Figure 3:
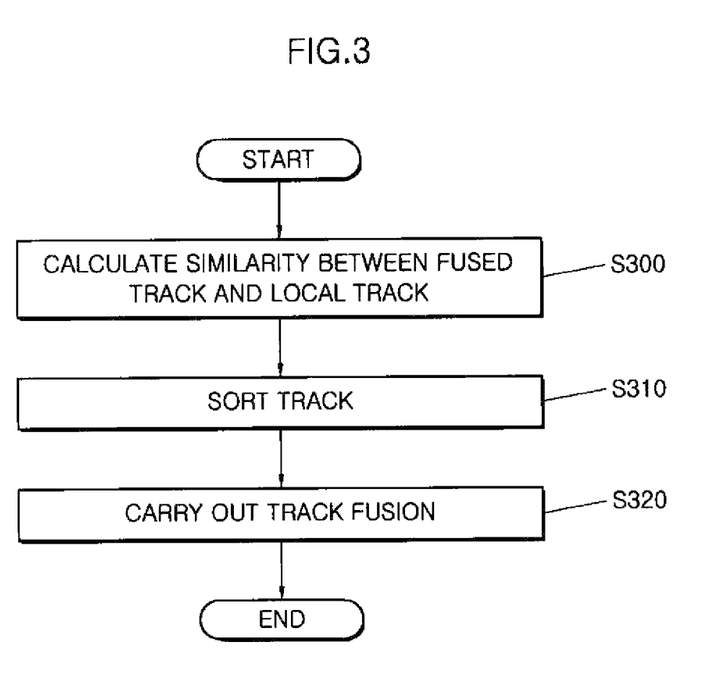
FIG. 3 is a flow chart illustrating an algorithm for carrying out track fusion and association to transmit at least error covariance data in accordance with an embodiment of the present invention.

Therefore, the track fusing process is carried out using the track information, which is illustrated in FIG. 3.

FIG. 3 is a flow chart illustrating an algorithm for carrying out track fusion and association to transmit at least error covariance data in accordance with the embodiment of the present invention. Referring to FIG. 3, the fusion center 190 (FIG. 2) calculates similarity to the existing fused tracks by using the track information transmitted from respective radar.

When the similarity is calculated, pairs of the respective fused tracks for carrying out the track fusion and the tracks transmitted from the radars are sorted by sorting the tracks (S310).

Next, the track fusion is finally carried out by using the track information sorted by the method for track association (S320).

Figure 4A:
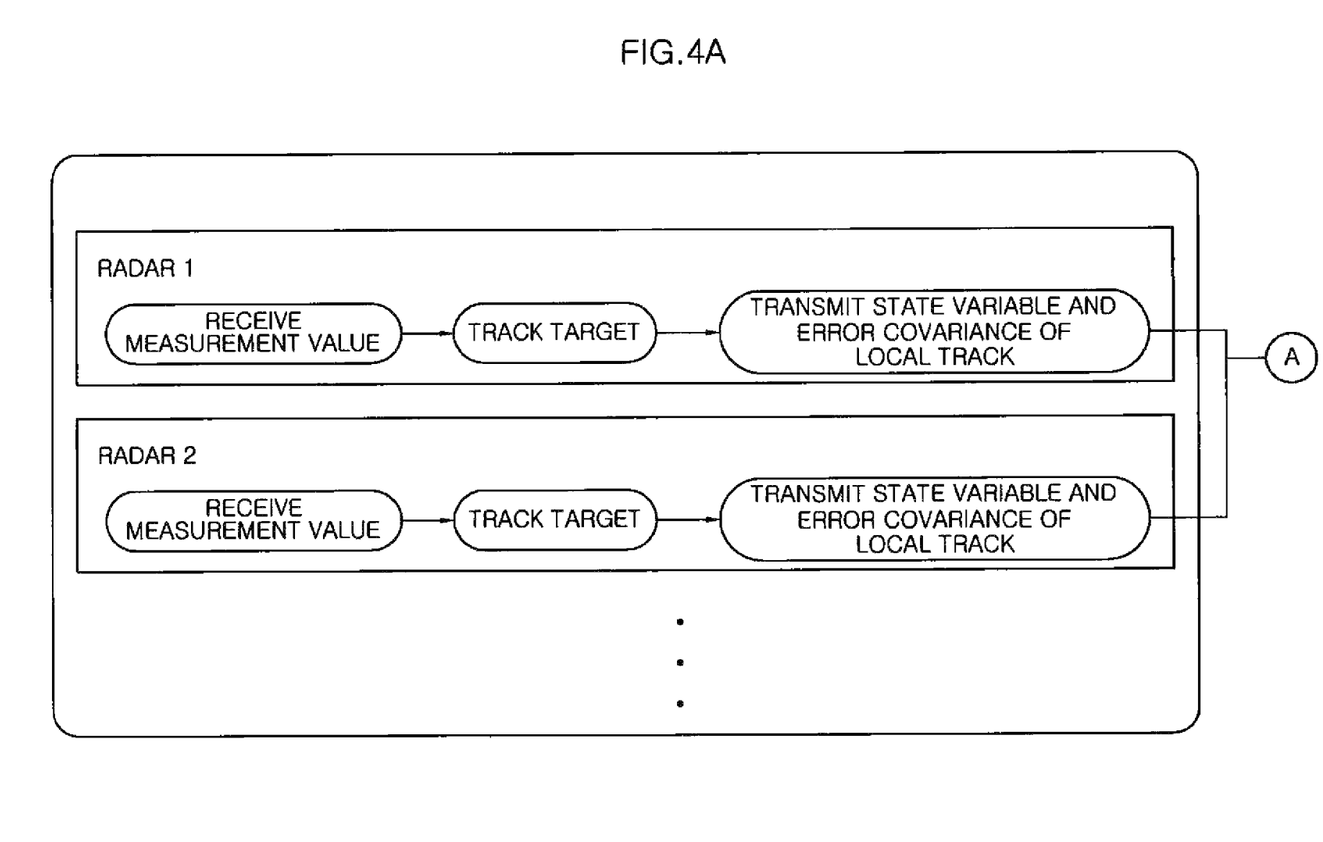
FIGS. 4A and 4B are flow charts illustrating a merger of a target tracking algorithm and an algorithm for carrying out track association and fusion illustrated in FIGS. 2 and 3, respectively so as to easily understand a relationship of the target tracking algorithm and the algorithm for carrying out track association and fusion.
Figure 4B:
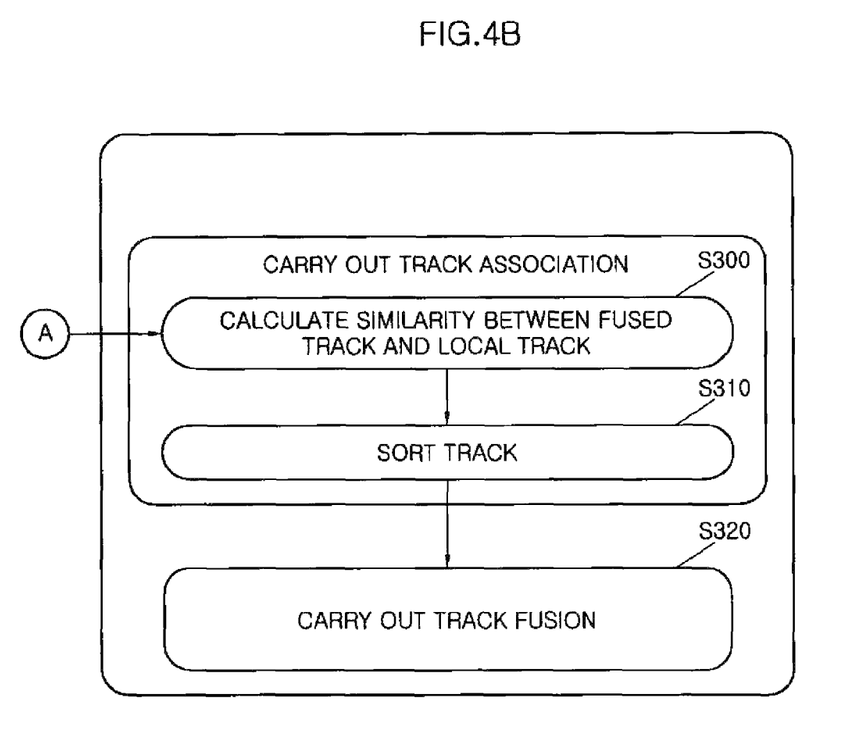

FIGS. 4A and 4B are flow charts illustrating a merge of a target tracking algorithm and an algorithm for carrying out track association and fusion illustrated in FIGS. 2 and 3, respectively so as to easily understand a relationship of the target tracking algorithm and the algorithm for carrying out track association and fusion.

Meanwhile, the method for producing at least information for track association and fusion in accordance with the embodiment of the present invention is implemented by a program instruction code type which may be carried out by various computer devices so as to be able to be recorded in computer-readable storage media.

The computer-readable storage media may include program instructions, data files, a data structure, or the like, alone or a combination thereof.

The program instructions recorded in the computer-readable storage media may be especially designed and constituted for the present invention or program instructions known to those skilled in the art of computer software may be used.

An example of the computer-readable storage media may include magnetic media such as a hard disk, a floppy disk, and a magnetic tape, optical media such as CD-ROM and DVD, magneto-optical media such as floptical disk, and hardware devices specially configured, to store and carry out program instructions, such as ROM, RAM, flash memory, and the like.

The media may be light including a carrier wave transmitting signals which designate the program instructions, the data structure, etc., or transmission media such as a metal line and a waveguide.

Examples of the program instructions may include machine language codes being made by compilers as well as high-level language codes capable of being executed by computers using interpreters, or the like. The hardware device may be constituted to be operated as at least one software module so as to carry out the operations of the present invention, and vise versa.

Further, the embodiment of the present invention may be implemented by hardware, software, or a combination thereof. The hardware may be implemented as an application specific integrated circuit (ASIC), a digital signal processing (DSP), a programmable logic device (PLD), a field programmable gate array (FPGA), a processor, a controller, a microprocessor, other electronic units, or a combination thereof, all of which is designed so as to carry out the above-mentioned functions.

The software may be implemented as a module carrying out the above-mentioned functions. The software may be stored in a memory unit and is executed by a processor. The memory unit or the processor may adopt various units that are known to those skilled in the art.

Comparing to the method for track association and fusion for radar target tracking in accordance with the related art, the exemplary embodiments of the present invention may implement the algorithm for carrying out track association and fusion by using only a portion of information of the error covariance occupying the considerable amount of data under the environment in which the traffic is limited so as to minimize the degradation in fusion performance and reduce the required data at the time of the fusion, thereby carrying out the real-time data transmission and calculation.

Further, the exemplary embodiments of the present invention may be suitable for the system, such as an air defense command and control alert system which needs to manage and fuse hundreds of tracks using the information on each track, since the system has the hardware band limit of the data traffic.

In addition, the exemplary embodiments of the present invention may provide the scheme for track fusion and association for radar target tracking which is a core of the system, such as an air defense command and control alert system, thereby obtaining better fusion performance without greatly increasing the band width.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A method for producing information for track association and fusion, comprising:
    collecting, by a receiving system, measurement values of targets for each sensing period from a plurality of transmitters;
    tracking, by the receiving system, the targets through a target tracking algorithm for predicting and reforming state variables for the targets and error covariances for the state variables using the collected measurement values;
    transmitting, by the receiving system, track information including only data of the error covariance largest occupied among the error covariances to a server of a fusion center;
    calculating, by the server of the fusion center, similarity between pre-stored fused track and the transmitted track information;
    sorting, by the server of the fusion center, the track information by using the calculated similarity; and
    carrying out, by the server of the fusion center, the track fusion based on the sorted track information.

2. The method of claim 1, wherein the target tracking algorithm is a Kalman filter.

3. The method of claim 1, wherein the data of the error covariance largest occupied among the error covariances are produced by using a minimum information production scheme.

4. The method of claim 3, wherein the state variable is a three-dimensional position, a velocity, and an acceleration of the target.

5. The method of claim 4, wherein the minimum information production scheme produces, as a representative value, the largest values for each axis among variance values of the position, the velocity, and the acceleration.

6. The method of claim 5, wherein errors of the position, the velocity, and the acceleration are similar at each axis.

7. The method of claim 5, wherein a correlation between the state variable components is disregarded.

* * * * *